United States Patent Office 3,437,721
Patented Apr. 8, 1969

3,437,721
PHOSPHATO-PHOSPHORUS COMPOUNDS AND PROCESS FOR PREPARING SAME
Charles F. Baranauckas, Memphis, Tenn., and Irving Gordon, Niagara Falls, N.Y., assignors to Hooker Chemical Corporation, Niagara Falls, N.Y., a corporation of New York
No Drawing. Filed Sept. 1, 1964, Ser. No. 393,778
Int. Cl. C07f 9/12, 9/08
U.S. Cl. 260—928                         10 Claims

ABSTRACT OF THE DISCLOSURE

Compounds such as (a) tris(1-chloro-3-diphenyl phosphato-2-propyl) phosphite, and (b) tris(2-diisooctyl phosphato-ethyl) phosphite, and a process for producing the compounds, such as by reacting dimethyl phosphate with triphenyl phosphite, typically at about 145° C. to about 155° C.

---

This invention relates to organic phosphorus compounds. More particularly, it relates to new phosphato-phosphites and a method of preparation thereof.

In accordance with this invention, novel phosphato-phosphites have been prepared of the formulae: (a) $(R^7O)_{3-y}$—P—$(OR^8)_y$ where $R^8$ is selected from the group consisting of

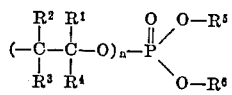

and

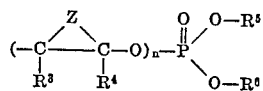

$R^7$ is selected from the group consisting of hydrogen, alkyl, aryl, aralkyl, alkaryl, cycloalkyl, allyl, substituted alkyl, substituted aryl, substituted aralkyl, substituted alkaryl, substituted cycloalkyl and substituted allyl, said substituents being inert under conditions of reaction, $R^1$, $R^2$, $R^3$, $R^4$ and $R^5$ may be the same or different and are selected from the group consisting of hydrogen, alkyl, allyl, aryl, aralkyl, alkaryl, cycloalkyl, substituted alkyl, substituted allyl, substituted aryl, substituted aralkyl, substituted alkaryl and substituted cycloalkyl, said substituents being inert under conditions of reaction, $R^6$ is selected from the group consisting of $R^5$,

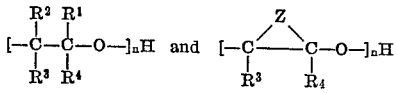

Z is selected from the group consisting of bivalent alkylene having from 2 to 7 carbons and arylene having from 6 to 24 carbons, $n$ is 1 to 10, and $y$ is 1 to 3, and (b) polymers thereof.

The compounds of the invention may be prepared by reacting about one to three moles, e.g., one, two or three moles, of a hydroxyl containing phosphate having the formula:

(c) 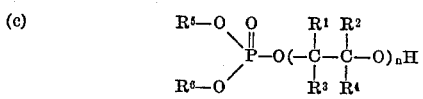

or (d) 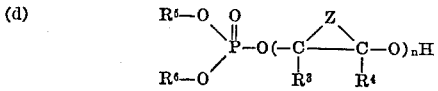

where $R^1$, $R^2$, $R^3$, $R^4$, $R^5$, $R^6$, $n$ and Z are as defined above, with about one mole of a suitable primary, secondary or tertiary phosphite, $(R^7O)_mP(OH)_{3-m}$, wherein $R^7$ is as defined above and $m$ is from 1 to 3.

The compounds provided by the invention are stable, generally high boiling compositions, which range from viscous liquids to waxy and crystalline products. They can be advantageously utilized for a wide variety of industrial and agricultural purposes as fungicides, insecticides and bacteriostats, for example; as stabilizers for synthetic resins, such as polyvinyl chloride; and as functional fluids in electrical and force-transmission applications. These compounds can also be utilized as rubber compounding chemicals and as lubricant additives. In addition, the tris (phosphato) phosphites of the invention are useful flameproofing agents for cellulosic and carbonaceous materials.

Reactions involved in the preparation of the novel phosphites of the invention may be illustrated by the reactions:

1. 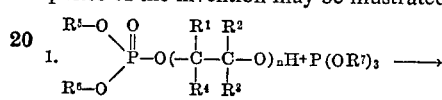

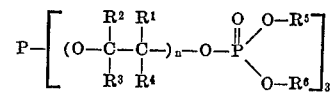

2. 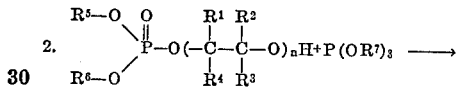

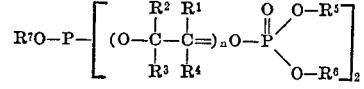

3. 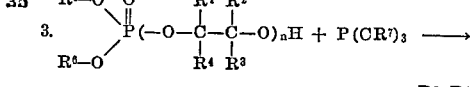

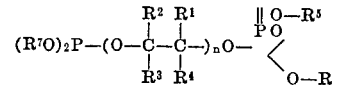

The hydroxyl containing phosphates of the invention may be prepared by reacting an epoxide having the formula

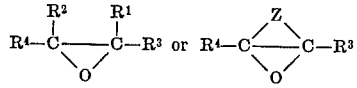

or mixtures thereof with a phosphoric acid monoester or diester having the formula:

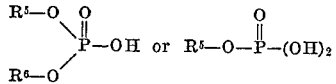

or mixtures thereof, where $R^1$, $R^2$, $R^3$, $R^4$, $R^5$, and $R^6$ are as defined above. The reaction may be illustrated as follows:

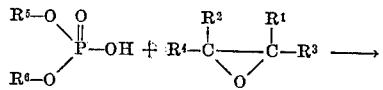

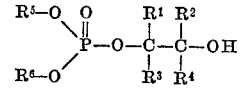

While equimolar amounts of the reactants can be used, it is advantageous to use an excess of the epoxy compound (usually as much as 100 percent or more in excess of an equimolar quantity), thereby reducing to a minimum the acidity of the hydroxyalkyl phosphate ester product. Completion of the reaction is readily determined since the disubstituted phosphoric acids are relatively strong acids. The epoxy compound is added slowly to the phosphate diester, maintained at a reaction temperature from about −20 degrees centigrade to about 180 degrees centigrade, although a temperature within the range of 50 degrees centigrade to 150 degrees centigrade is preferred. A catalyst is not required. However, the reaction can be carried out in the presence of catalytic amounts of acidic catalysts such as boron trifluoride and its ethyl ether complex. After addition of the selected amount of the epoxide is complete, it sometimes is desirable to agitate the reaction mixture for an additional 1 to 4 hours, to secure a product of low acid content. Any unreacted epoxy compound can be removed by distillation under vacuum. The residual phosphate ester then is employed for the preparation of the phosphato-phosphites of the invention.

When the disubstituted phosphoric acid is a solid, it is preferred to conduct the reaction with the epoxy compound in the presence of an organic solvent for such ester which is free from hydroxyl groups and is inert to the reactants and product. Among the suitable solvents are the alkyl ethers, such as ethyl ether, the paraffinic and aromatic hydrocarbons, such as heptane and benzene and halohydrocarbons such as ethylene dichloride and chlorobenzene.

The phosphato-phosphite esters of the invention may be prepared starting with the epoxy compound and the phosphoric acid ester to form the hydroxyl containing phosphate compound, adding the mono-, di- or triorganophosphite to the phosphate compound and reacting this mixture at a temperature of from 0 to about 300 degrees centigrade. The reaction is preferably carried out at temperatures of from 130 to 180 degrees centigrade. The pressure utilized may be atmospheric, subatmospheric or superatmospheric.

Epoxy compounds that may be utilized in the practice of the invention have the formulae:

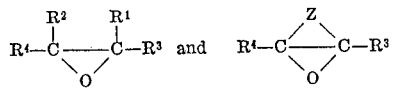

where Z is as defined above and $R^1$, $R^2$, $R^3$, and $R^4$ are selected from the group consisting of alkyl and substituted alkyl having from 1 to 20 carbons, preferably 1 to about 12 carbons, allyl and substituted allyl having from 3 to about 20 carbons, preferably from 3 to about 12 carbons, aryl and substituted aryl having from 6 to about 24 carbons, preferably from 6 to about 18 carbons, aralkyl and substituted aralkyl having from 7 to about 25 carbons, preferably from 7 to about 19 carbons, alkaryls and substituted alkaryls having from 7 to about 25 carbons, preferably from 7 to about 19 carbons, and cycloalkyl and substituted cycloalkyls having from 4 to about 6 carbons, said substituents, if any, being inactive under conditions of reaction.

Examples of epoxides that are utilizable in the practice of the invention are ethylene oxide, propylene oxide, epichlorohydrin, epibromohydrin, 1,2-epoxybutane, dipentene monoxide, α-pinene oxide, epoxidized glyceryl monooleate, N-(n-hexyl)-9,10-epoxystearamide, butyl epoxystearate, methyl epoxystearate, isooctyl epoxystearate, 2 chloroethyl epoxystearate, phenyl epoxystearate, p-tert-butyl epoxystearate, epoxidized glyceryl mono-ricinoleate, p-(2,3-epoxypropoxy)phenyl urea, 3,4-epoxy-6-methylcyclohexane carboxylate, epoxidized oleic acid, glycidol, β-methylglycidol, β-ethylglycidol, para-ethylstyrene oxide, dimethylstyrene oxide, 4-(2,3-epoxypropoxy) acetophene, paratertiary amyl and para-secondary amyl phenoxy propene oxides, isobutylene oxide, di-(2,3-epoxypropoxy)benzene, 1,2,5,6-diepoxyhexane, p-divinylbenzene dioxide, 1-vinyl-3-hexene dioxide, 1,2,3,4-diepoxy-1,4-diphenyloctane, phenoxy butylene oxide, alpha-naphthoxy propylene oxide, p-chlorophenoxy propylene oxide, cresoxy propylene oxide, glycidyl chloride, epoxycyclohexyl bromide, epoxycyclopentyl chloride, epoxydicyclopentyl bromide, butylene oxide, diisobutylene oxide, ethyl 3,4-epoxy-2,5-endomethylene cyclohexoate, esters of epoxypropionic acid, alkyl or aryl substituted ethylene and propylene oxides, 2,3-epoxydihydropyran, cyclohexylepoxy, cyclopentyl epoxy and dicyclopentyl epoxy.

The acid phosphates that may be utilized in the practice of this invention have alkyl and substituted alkyl radicals with from 1 to about 20 carbons, and more preferably 1 to 12 carbons, aryl and substituted aryl radicals with from 6 to about 24 carbons, and more preferably 6 to 18 carbons and the aralkyl and substituted aralkyl radicals with from 7 to about 25 carbons, and more preferably from 7 to 19 carbons, aralkyl and substituted aralkyl having from 7 to about 25 carbons, preferably from 7 to about 19 carbons, alkaryls and substituted alkaryls having from 7 to about 25 carbons preferably from 7 to about 19 carbons, and cycloalkyl and substituted cycloalkyls having from 4 to about 6 carbons, said substituents, if any, being inactive under conditions of reaction. Examples of acid phosphates are: dimethyl-; methyl-; ethylmethyl-; ethylisopropyl-; dibutyl-; hexyl-; dihexyl-; 2-ethylhexyl-; octyl-; octadecyl-; 2-chloroethyl-; di-(2-chloropropyl)-; 2,3-dichloropropyl-; 2-bromoethyl; 2-fluoroethyl-; di(4-chlorobutyl)-; phenyl-; di-phenyl-; phenyl p-di-chlorophenyl-; 2,4-dichlorophenyl-; di(-p-dibromophenyl-); cresyl-; di-(p-tertbutylphenyl); p-nonylphenyl; di(p-dodecylphenyl)-; phenylethyl-; di(ethylphenyl); cyclopentyl-; dibenzyl-; 4-nonylbenzyl-; phenyl-α-phenylmethyl-; napthyl-; and 4-dodecyl phenyl-acid phosphates, and mixtures of these mono- and diester acid phosphates.

The utilization of a conventional transesterification catalyst accelerates the rate of reaction of the hydroxy-containing phosphate with organic phosphite. Examples of such catalysts are alkali metal alcoholate, phenolate or hydride, such as sodium methylate, lithium propionate, potassium butyrate, sodium ethylate, sodium phenylate, potassium phenylate, sodium cresylate, sodium hydride, mixtures thereof, and so forth, sodium metal, lithium metal, the hydroxides of these metals, e.g., sodium hydroxide and lithium hydroxide, diesters of phosphorous acid, e.g., diethyl phosphite and diphenylphosphite, mixtures thereof, and so forth. It is preferred that the basic transesterification catalyst utilized have a pH of at least 7.5 in a 0.1 normal solution.

Organophosphites that may be utilized in the practice of this invention are those having the formula:

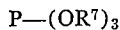

where $R^7$ is selected from the group consisting of hydrogen, alkyl and substituted alkyl having from 7 to 20 carbons, allyl and substituted allyl having from 3 to about 20 carbons, aryl and substituted aryl having from 6 to 24 carbons, aralkyl and substituted aralkyl having from 7 to about 20 carbons, alkaryl and substituted alkaryl having from 7 to 20 carbons, and cycloalkyl and substituted cycloalkyl having from 4 to 8 carbon atoms, where said substituents, if any, in each instance, are inert to or do not adversely affect the conditions of reaction. Illustrative are triphenyl phosphite, tris-(o-cresyl) phosphite, tris-(4-chlorophenyl) phosphite, tris-(4-bromophenyl) phosphite, tris-(betachloroisopropyl) phosphite, tris-(3-bromophenyl)-phosphite, tris-(xylenyl) phosphite, tris-(alpha napthyl) phosphite, diphenyl decyl phosphite, didecyl phenyl phosphite, triallyl phosphite, trimethallyl phosphite, tridecyl phosphite, tris-(octadecyl) phosphite, tris-(cyclohexyl)phosphite, trilauryl phosphite, trimethyl phosphite, tricyclohexylphenyl phosphite, tricyclohexane phosphite, tris (beta napthyl) phosphite, diphenyl phosphite, monophenyl phosphite, and mixtures thereof, dimethyl and monomethyl phosphite and mixtures thereof, mono- and diethyl phosphite, mono- and di-2-chloroethyl phosphite, mono- and dioctyl phosphite, 4-allyl-2-methoxyphenyl phosphite, decyl phosphite, mono- and di-2-bromoethyl phosphite, mono- and di-nonyl-phenyl phosphite, dibutyl phosphite, di-lauryl phosphite, dicyclopentyl phosphite and diallyl phosphite.

The following examples illustrate the invention, but are not intended to limit it in any manner. All parts are by weight and temperatures are in degrees centigrade unless otherwise indicated.

EXAMPLE 1

Making phosphate reactants

A mixture of mono-phenyl acid phosphate and di-phenyl acid phosphate (10 parts) was added to a reaction vessel having epichlorohydrin (50 parts) therein. The reaction mixture was refluxed for about one hour, under nitrogen, at a temperature in a range of from 85 to about 125 degrees centigrade. Excess epichlorohydrin was removed by vacuum distillation at a temperature of from 100 to about 110 degrees centigrade to an ultimate vacuum of 15 millimeters of mercury absolute. A major proportion of the residue was 3-chloro-2-hydroxypropyl ethyl diphenyl phosphate, which has the structure:

$$\left(\left\langle\bigcirc\right\rangle-O\right)_2-\overset{O}{\underset{\parallel}{P}}-O-\overset{H}{\underset{H}{C}}-\overset{CH_2Cl}{\underset{H}{C}}-OH$$

A sample of this product was submitted to infrared analysis. This analysis confirmed the presence of the above compound. Some bis-(3-chloro-2-hydroxy propyl) phenyl phosphate was present. Utilizing the procedure set forth above epoxides, such as, ethylene oxide, propylene oxide, dipentene monoxide, epoxidized glyceryl mono-oleate, H-(n-hexyl) 9,10-epoxystearamide, butyl epoxystearate, 2-chloroethyl epoxystearate, phenyl epoxystearate, butyl epoxytallate, epoxidized glyceryl mono-ricinoleate, phenyl glycidyl ether, tolyl glycidyl ethers, naphthyl glycidyl ethers, 1-(2-phenylphenoxy) propylene oxide-2,3, and so forth, in place of epichlorohydrin also yield phosphates having one or more hydroxyls.

EXAMPLE 2

Tricresyl phosphite (3.9 parts), sodium hydride (0.1 part) and 8.3 parts of the reaction product of Example 1 were added to a reaction vessel. The reaction mixture was stirred and heated for about one hour at a temperature of 145 to about 155 degrees centigrade. Volatiles were distilled, utilizing an ultimate vacuum of about 0.03 millimeter of mercury absolute at a temperature of from 150 to 160 degrees centigrade. The major proportion of distillate recovered was identified as cresol by gas chromatography. The residue had the structure:

$$P-\left[O-\overset{CH_2Cl}{\underset{H}{C}}-\overset{H}{\underset{H}{C}}-O-\overset{O}{\underset{\parallel}{P}}-\left(O-\left\langle\bigcirc\right\rangle\right)_2\right]_3$$

Infrared analysis of the residue confirmed the presence of tris (1-chloro-3-diphenyl phosphato-2-propyl) phosphite, having a phosphorus content of 10.5 percent.

EXAMPLE 3

A mixture of mono- and di-(iso-octyl hydroxyethyl) phosphate (48.7 parts), tri-(isobutyl) phosphite (12.5 parts) and sodium methoxide (0.2 part), in a reaction vessel was stirred and heated under a nitrogen feed at a temperature from 145 to about 155 degrees centigrade for a period of about one hour. The volatiles were distilled utilizing an increasing vacuum with ultimate conditions of 9 millimeters of mercury at a temperature of about 150 degrees centigrade. The residue contained a major proportion of tris (2-dioctyl phosphato-ethyl)phosphite, a viscous oil having the formula:

$$P-[(O-C_2H_5-O-\overset{O}{\underset{\parallel}{P}}-(O-iso-C_8H_{17})_2]_3$$

and an $n_D^{25}$ of 1.4549 and a percent phosphorus of 11.0. Infrared analysis of a sample of the product confirmed the presence of phosphatophosphite.

EXAMPLE 4

Example 2, repeated, utilizing ⅓ mole of triphenyl phosphite for each mole of hydroxyl in the starting material in lieu of tricresyl phosphite results in tris-(1-chloro-3-diphenylphosphato-2-propyl) phosphite being obtained.

EXAMPLE 5

Example 2, repeated, utilizing ⅓ mole of diphenyl phosphite for each mole of hydroxyl in the starting material results in tris-(1-chloro-3-diphenyl-phosphato-2-propyl) phosphite being obtained.

Utilizing the procedures set forth in the above examples, the following compounds are prepared:

| Example No. | Phosphato | Phosphite | Mole ratio | Product |
|---|---|---|---|---|
| 6 | 2-hydroxyethyl-dibutyl phosphate. | Trimethyl phosphite. | 3/1 | Tris(-2-dibutyl phosphatoethyl) phosphite. |
| 7 | 2-hydroxy-α-ethyl-ethyl-dichloro-phenyl phosphite. | Monomethyl phosphite. | 1/1 | Mono-(2-di(chloro-phenyl) phos-phato-ethyl) phosphite.) |
| 8 | 2-hydroxycyclo-hexyl-diphenyl phosphite. | Triallyl phosphite. | 3/1 | Tris(-2-diphenyl phosphato-cyclohexyl) phosphite. |
| 9 | 2-hydroxyethyl-dibutyl phosphate. | Tris(2-phenyl-ethyl) phosphite | 3/1 | Tris(-2-dibutyl phosphato-ethyl) phosphite. |
| 10 | 2-hydroxyethyl diphenyl phosphate. | Tris(p-ethyl phenyl) phosphite. | 3/1 | Tris(-2-diphenyl phosphato-ethyl) phos-phite. |
| 11 | 3-bromo-2-hydroxypropyl didecyl phosphate. | Tricyclohexyl phosphite. | 2/1 | Bis(-1-bromo-3-didecyl phos-phato-2-propyl) cyclohexyl phos-phite. | and polymers thereof.

While there have been described various embodiments of the invention, the compositions and methods described are not intended to be understood as limiting the scope of the invention, as it is realized that all equivalent elements for accomplishing substantially the same results in substantially the same or equivalent manner, covering the invention broadly in whatever form, may be utilized.

What is claimed is:

1. A compound of the formula $$(R^7O)_{3-y}-P-(OR^8)_y$$

wherein $R^8$ is selected from the group consisting of $$(-\overset{R^2}{\underset{R^3}{C}}-\overset{R^1}{\underset{R^4}{C}}-O)_n-\overset{O}{\underset{\parallel}{P}}\diagup\overset{O-R^5}{\diagdown O-R^6}$$

and $$(-\overset{Z}{\underset{R^3}{C}}\diagdown\overset{}{\underset{R^4}{C}}-O)_n-\overset{O}{\underset{\parallel}{P}}\diagup\overset{O-R^5}{\diagdown O-R^6}$$

wherein $R^7$ is selected from the group consisting of hydrogen, alkyl of 7 to 20 carbon atoms, allyl, aryl of 6 to 24 carbon atoms, aralkyl of 7 to 20 carbon atoms, alkaryl of 7 to 20 carbon atoms, and cycloalkyl of 4 to 8 carbon atoms; wherein $R^1$, $R^2$, $R^3$, $R^4$, and $R^5$ are each independently selected from the group consisting of hydrogen, alkyl of 1 to 20 carbon atoms, aryl or 6 to 24 carbon atoms, allyl, aralkyl of 7 to 25 carbon atoms, alkaryl of 7 to 25 carbon atoms, and cycloalkyl of 4 to 6 carbon atoms; wherein $R^6$ is selected from the group consisting of $R^5$,

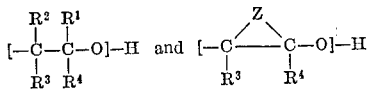

wherein Z is selected from the group consisting of alkylene of 2 to 7 carbon atoms and arylene of 6 to 24 carbon atoms; $n$ is 1 to 10; and $y$ is 1 to 3.

2. Tris (1-chloro-3-diphenyl phosphato-2-propyl)phosphite.

3. Tris (2-diisooctyl phosphato-ethyl) phosphite.

4. A process for preparing a phosphato-phosphite of formula $$(R^7O)_{3-y}-P-(OR^8)_y$$

by reacting at 0° C. to about 300° C., (1) a phosphite of the formula

wherein $R^7$ is selected from the group consisting of hydrogen, alkyl of 7 to 20 carbon atoms, allyl, aryl of 6 to 24 carbon atoms, aralkyl of 7 to 20 carbon atoms, alkaryl of 7 to 20 carbon atoms, and cycloalkyl of 4 to 8 carbon atoms; with (2) a hydroxyl-containing phosphate of the formula

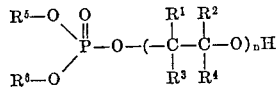

or

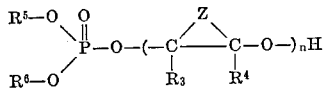

wherein $R^1$, $R^2$, $R^3$, $R^4$ and $R^5$ are independently selected from the group consisting of hydrogen, alkyl of 1 to 20 carbon atoms, aryl of 6 to 24 carbon atoms, allyl, aralkyl of 7 to 25 carbon atoms, alkaryl of 7 to 25 carbon atoms, and cycloalkyl of 4 to 6 carbon atoms; wherein $R^6$ is selected from the group consisting of $R^5$,

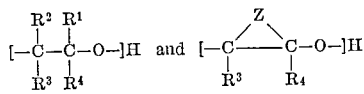

wherein Z is selected from the group consisting of alkylene of 2 to 7 carbon atoms and arylene of 6 to 24 carbon atoms; $n$ is 1 to 10; and $y$ is 1 to 3.

5. A process in accordance with claim 4, wherein the phosphite reactant is a primary phosphite.

6. A process in accordance with claim 4, wherein the phosphite reactant is a secondary phosphite.

7. A process in accordance with claim 4, wherein the phosphite reactant is a tertiary phosphite.

8. A process in accordance with claim 4, wherein the molar ratio of phosphate to phosphite is about 3 to 1 and the temperature of reaction is between about 130° C. and about 180° C.

9. A process in accordance with claim 4, wherein the molar ratio of phosphate to phosphite is about 2 to 1 and the reaction temperature is between about 130° C. and about 180° C.

10. A process in accordance with claim 4, wherein the molar ratio of phosphate to phosphite is about 1 to 1 and the reaction temperature is between about 130° C. and about 180° C.

References Cited

UNITED STATES PATENTS 3,121,106  2/1964  Nagy _____ 260—978 XR

CHARLES B. PARKER, *Primary Examiner.*

ANTON H. SUTTO, *Assistant Examiner.*

U.S. Cl. X.R.

260—978, 982, 929, 45.7, 348, 999; 252—400, 32.5, 78

UNITED STATES PATENT OFFICE
CERTIFICATE OF CORRECTION

Patent No. 3,437,721   Dated April 8, 1969

Inventor(s)   Charles F. Baranauckas et al.

It is certified that error appears in the above-identified patent and that said Letters Patent are hereby corrected as shown below:

Column 2, line 20, the first half of the first formula should appear as follows:

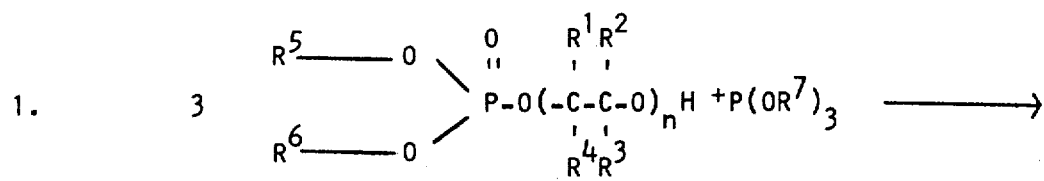

Column 2, line 30, the first half of the second formula should appear as follows:

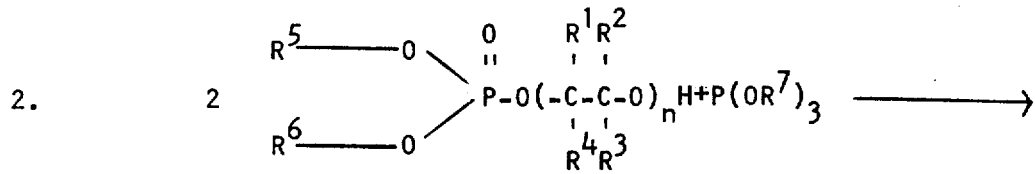

Column 2, line 37, the first half of the third formula should appear as follows:

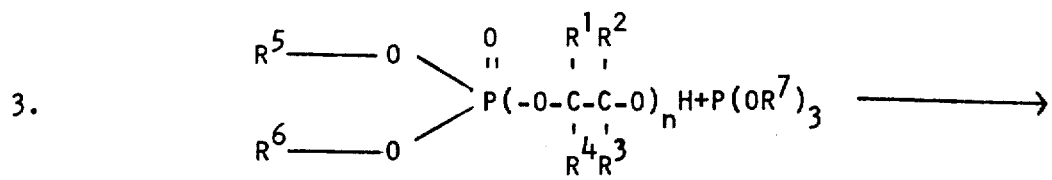

PO-1050
(5/69)

UNITED STATES PATENT OFFICE
CERTIFICATE OF CORRECTION

Patent No. 3,437,721    Dated April 8, 1969

Inventor(s)    Charles F. Baranauckas et al.

It is certified that error appears in the above-identified patent and that said Letters Patent are hereby corrected as shown below:

Column 2, line 40, the second half of the third formula should appear as follows:

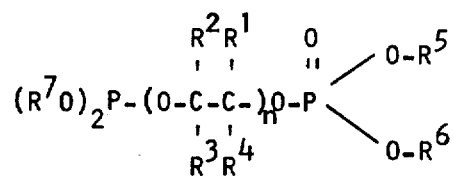

Column 2, line 43, delete "invention6" and insert -- invention --.

column 6, claim 1, line 73, delete "or" and insert -- of --.

SIGNED AND
SEALED
NOV 3 1970

(SEAL)
Attest:

Edward M. Fletcher, Jr.
Attesting Officer

-2-

WILLIAM E. SCHUYLER, JR.
Commissioner of Patents